3,115,352
ALIGNMENT COMPENSATING COUPLING
William J. Heerlein, Fern Creek, Ky., assignor to General
Electric Company, a corporation of New York
Filed July 20, 1960, Ser. No. 44,221
1 Claim. (Cl. 285—9)

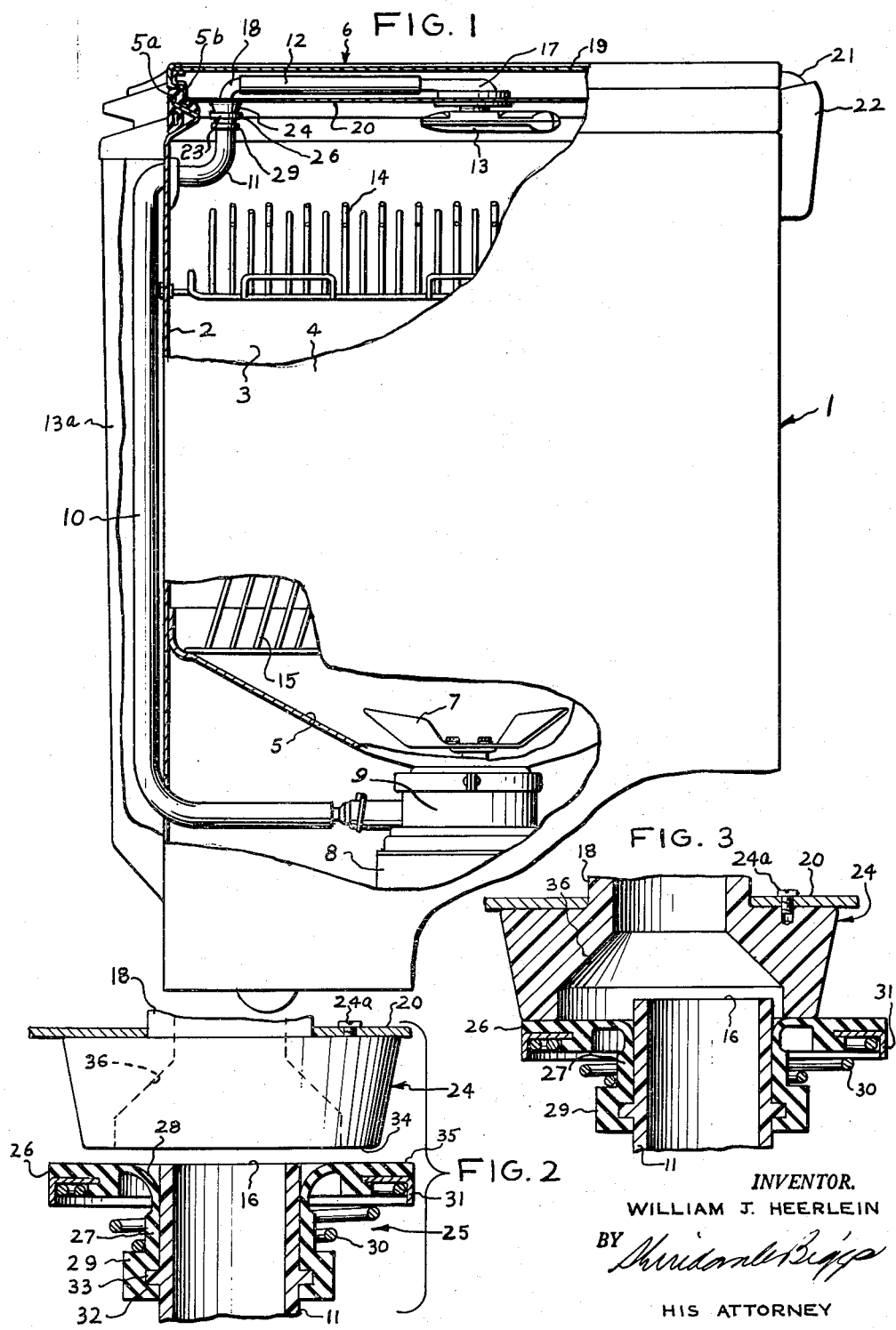
Dec. 24, 1963     W. J. HEERLEIN     3,115,352
ALIGNMENT COMPENSATING COUPLING
Filed July 20, 1960
INVENTOR.
WILLIAM J. HEERLEIN
HIS ATTORNEY

This invention relates to a fluid coupling for use in a conduit which is opened and closed by the relative movement of two members, and more particularly to such a coupling useful in dishwashing machines and the like for effecting fluid coupling in a water line as in a water supply line or the drain line of the machine which coupling is opened when the cover of the machine is opened and reclosed to complete the conduit when the cover is closed.

Dishwashing machines have been provided heretofore with a water supply system and/or a liquid drain system wherein a coupling is provided for establishing a through conduit for the flow of liquid when the cover is closed and which breaks the conduit when the cover is opened. In one such system known heretofore the conduit is formed with two sections fixed to the tub and cover respectively of the machine. The coupling is provided with a sleeve or tube to fit on the end of one of the two sections, for example on that supported on the tub, and which mates with a tubular coupling fitted to the end of the cover conduit section. When the cover is closed the open ends of the tube and coupling are brought into registry to form a continuous liquid passageway in the conduit, and when the cover is opened the tube and coupling are separated and the conduit is opened. Since there are of necessity manufacturing tolerances in the machine which may result in variations in the position of the cover when closed both in the lateral and normal directions with respect to the tub, the coupling was made "flexible" so to speak. This was accomplished by providing flanges on the mating ends of the tube and coupling, one of the flanges, for example that one on the tube being made of soft rubber, so as to "give" when the cover is moved toward the closed position and the two flanges moved into contact; this was designed to take care of tolerance conditions or variations in the closed position of the cover normal to the tub opening. The coupling also was made with a relative wide opening in the tubular coupling in an effort to take care of tolerance conditions in the position of the cover laterally in the tub opening, the larger opening covering the smaller one in various lateral positions of the cover.

This seal proved to be satisfactory only when the tolerance variations are small. Lateral misalignment of the cover often resulted in excessive leaking at the seal between the tube and coupling flanges because when the cover was laterally deflected the cover coupling, of course, also was laterally deflected, often to such an extent that the edge of its opening substantially reached the outer edge of the mating flange on the tube; thus, there was left only a small area of the soft rubber flange in contact with the mating flange to act as a seal, and at times it was not sufficient to accomplish this function. Likewise in the case of certain variations in the normal position of the cover outwardly with respect to the tub excessive leakage resulted because of the resulting low sealing pressure between the flanges. This condition cannot be corrected by increasing the pressure between the flanges, because then variations in the positions of the cover in the other direction, that is, inwardly toward the tub could result in improper closing of the cover—in fact it may not close at all.

It is an object of this invention to provide an improved coupling seal of the kind described which will provide an effective liquid coupling regardless of the normal and lateral misalignments of the cover with respect to the tub within manufacturing limits.

In accordance with this invention the soft rubber flange on the tube of the tub for example is replaced by a relatively rigid flange which is connected with its tube by means of a thin or soft web-like rubber hinge. The flange is spring biased outwardly in the direction of the tube opening, that is, in the direction of the cover, with a predetermined force. Thus in the case of lateral misalignment the effectiveness of the seal no longer is dependent upon the "stiffness" of a soft rubber flange member but is effected by means of a spring biased rigid flange, the sealing pressure being maintained even though the cover coupling opening be shifted laterally to such an extent that but a small area of contact remains between the two flanges to seal them. Also, the spring is designed to maintain a good sealing relation between the two flanges for the outermost position of the cover with respect to the tub opening, and the thin rubber hinge yields for closer cover positions, the spring at all times functioning to hold the tube and coupling flanges in solid liquid sealing relation.

For a more complete understanding of this invention, reference may be had to the accompanying drawing in which:

FIG. 1 is a side vertical elevation of dishwashing apparatus provided with fluid coupling means arranged in accordance with this invention, parts of the apparatus being broken away and parts shown in section so as to illustrate certain details of construction;

FIG. 2 is an elevation of parts of the fluid coupling embodied in this invention, one of the elements being shown in section, and the figure being drawn to a much larger scale than in FIG. 1; and FIG. 3 is a sectional view of the elements shown in FIG. 2 and illustrating these elements in different relative positions than they occupy in FIG. 2.

Referring to the drawing this invention has been shown as applied to a portable dishwasher having a top opening tub and arranged with a spray device all as described in the copending Patent 2,987,260 of Russell M. Sasnett, which was filed November 18, 1959, and assigned to the General Electric Company the assignee of the present application. Briefly, this washing maching comprises a vertically positioned tub 1 defined by a front wall 2, a pair of opposed side walls 3 and 4, a rear wall (not shown) and a depressed bottom wall 5. The tub may be and as shown is square in horizontal cross section, and its upper edge 5a is closed by a similarly shaped cover 6, which preferably will seat on a sealing gasket 5b fitted to the edge 5a. A water circulating impeller 7 is mounted near the bottom wall 5 to rotate substantially in the central vertical axis of the tub; while any suitable impeller may be used I prefer to use the impeller described and claimed in the copending Patent 2,959,179 of Russell M. Sasnett and Lauren W. Guth, filed July 10, 1957, and assigned to the General Electric Company, the assignee of the present application. This impeller is driven by any suitable power means such as an electric motor 8. The motor 8 also drives a pump 9 which forces water through a conduit 10 leading from the pump 9 up and outside of the front wall 2 to a point adjacent its upper end, through a conduit 11 in the tub and a conduit 12 mounted in the cover 6 and leading to a spray device 13; a casing 13a encloses the conduit 10 at the front.

Suitable dish and utensil supporting racks 14 and 15 are supported in the upper and lower portions of the tub.

In the operation of the washer thus far described it will be understood that the motor 8 will operate the impeller 7 to effect a washing action on the dishes and utensils supported in the racks 14 and 15, and at the same time the motor 8 will operate the pump 9 to force water from the tub up through the spray device 13.

Preferably the conduit portion 10 will be in the form of a flexible hose leading from the discharge of the pump 9 forwardly to the outside of wall 2, thence upwardly to a point adjacent the top of the wall 2 where it enters the tub through a suitable nipple provided for it in the wall 2 and which is sealed in the wall with a liquid-tight connection. The nipple may be a part of the conduit section 11 which is located in the tub and which preferably will be formed of a rigid material such as a suitable thermoset plastic composition; the nipple functions to support the section 11 rigidly in the side wall 2. The nipple construction forms no part of this invention and hence it will not be described in detail; it is sufficient to state that the nipple supports the conduit section 11 rigidly from the wall 2 in a non-movable position. The section 11, as shown, is in the form of an elbow or a right angle with its upper end 16 (FIGS. 2 and 3) lying in a plane parallel with the top edge 5a of the tub, that is, parallel with the cover 6. The conduit section 12 mounted in the cover 6 is in the form of a length of hose with its right hand end, as viewed in FIG. 1, fitted over a feed line 17 leading to the spray device 13 and its left hand end fitted over a feed line or conduit 18 leading downwardly toward the pipe 11, that is, the element 18 is in the form of an elbow.

Preferably, the cover 6 will be provided with spaced apart upper and lower panels 19 and 20 which house the conduit section 12 and the liquid connections 17 and 18; and in the portable dishwasher shown the cover 6 preferably will be hinged by hinge elements 21 and 22 to the rear of the tub so that it may be swung upwardly from its closed position, shown in FIG. 1, to an open position. It is to be understood, however, that this invention is not limited to a machine wherein the cover is hinged to swing vertically in this way, but it may be applied equally as well to apparatus having a cover which moves straight upwardly and downwardly to open and closed positions as is the cover of the washing machine shown in United States patent to G. H. Wotring 2,654,386 dated October 6, 1953.

Interposed between the conduit section 11 and the conduit section 12 is a coupling device 23 embodying this invention. This coupling device comprises an enlarged flange-like head section 24 positioned below the bottom surface of the cover panel 20 but rigidly connected with the elbow 18 which passes through an aperture provided for it in the cover section 20. Preferably the elbow 18 and the flange head section 24 will be formed integrally together and may be of any suitable material such as a thermoset plastic composition, and the head 24 will be secured to the cover panel by suitable screws 24a (FIG. 2). The coupling 23 further comprises a coupling element 25 which is supported by the conduit section 11 in the tub. The member 25 is formed with an annular flange 26 spaced from and in substantially concentric relation with the conduit 11, a sleeve 27 fitted closely about the upper end of the conduit 11, and a relatively thin flexible web-like hinge portion 28 connecting and supporting the flange 26 from the sleeve 27; the coupling member 25 further comprises a second flange 29 mounted on the lower end of the sleeve section 27 so as to be spaced somewhat below the flange 26; and interposed between the two flanges 26 and 29 is a helical compression spring 30. The lower end of the spring 30 bears against the flange 29 while its upper end seats within and bears against an inverted pan-shaped annular ring 31 formed of any suitable relatively strong material, such as stainless steel. The body of the annular ring 31, as shown, lies in a plane substantially parallel to the plane of the top of the flange 26. While the flange 26, sleeve 27, flexible web 28 and flange 29 may be formed of any suitable material I prefer to form them integrally into one structure of molded rubber and when making this assembly I prefer to embed the annular ring 31 in the flange 26.

Preferably the flange 29 will be interlocked with the conduit 11 and for this purpose I provide the conduit 11 with an outwardly extending circular flange 32 which is received in a circular recess 33 provided for it in the inner wall of the flange 29.

It will be observed that the two members 24 and 26 have opposed flat faces 34 and 35 parallel to each other and with the plane of the top edge 5a of the tub.

It will be understood that the parts 24 and 25 are so positioned that when the cover is closed the openings in the conduit 11 and conduit 18 will be brought into substantial registry so that a through conduit is effected through the coupling 23. It is also preferable that the opening in the conduit 18 connect through the coupling member 24 by means of enlarged opening 36 formed through the member 24 as shown in FIGS. 2 and 3.

In the operation of the coupling it will be understood that when the cover 6 is closed the flange head 24 will move downwardly to bring its face 34 against the flange face 35 and that when this occurs the flange 26 will yield somewhat in the downward direction, and that the two parts 24 and 26 will be engaged with sufficient force to effect a liquid-tight seal between the conduits 11 and 18. While the flange 26 has substantial rigidity imparted to it by the metal ring 31, it is permitted to yield in this way by reason of the web-like hinge 28; it will be understood that variations in the vertical position of the cover with respect to the tub will be absorbed by this yielding motion of the flange 26. In FIG. 3, the flange 26 has been shown depressed to a considerable degree by reason of the cover being positioned downwardly to such a degree with respect to the tub. But since the flange 26 is always biased upwardly by the force of the spring 30 it will be forced against the flange head 24 with substantially the same force regardless of the position the cover 6 assumes in its closed position vertically with respect to the tub; in other words the sealing force remains substantially constant.

As pointed out previously the cover 6 may also occupy positions laterally such that the axes of the conduits 11 and 18 do not coincide precisely. FIG. 3 illustrates a misalignment of the cover in a lateral direction. In this case even though there is a material lateral deflection the flange 26 will be forcibly held in sealing relation with the flange 24 by means of the spring 30.

One incidental but very important advantage of this construction is that the strength of the flange 26 and the sealing force applied by the spring 30 are unaffected by changes with age in the properties of the rubber of which the member 25 is made.

While I have shown and described a specific embodiment of my invention, I do not desire the invention to be limited to the particular construction disclosed, and I intend by the appended claim to cover all modifications within the true spirit and scope of my invention.

What I claim as new and desire to secure by Letters Patent of the United States:

A full flow fluid coupling between a pair of conduits adapted to compensate for variations in the axial, lateral and canted orientation of said conduits comprising:
- (a) a first coupling member connected to the end of one of said conduits and provided with an outwardly extending flange-like head,
   - (aa) said first coupling member having a passage therethrough connecting with said one of said conduits,
   - (bb) said flange-like head having a first planar sealing surface,
- (b) a mating coupling member comprising a sleeve of relatively soft elastomeric material including an inner end and an outer end,
- (c) said inner end securely receiving the end of the other of said conduits in fluid-tight relationship, (aa) said sleeve having an opening therethrough in registry with said other of said conduits,
(d) said outer end forming a second planar sealing surface,
  (aa) said outer end having a rigid reinforcing member secured therein supporting said second planar sealing surface,
(e) said sleeve having an annular flexible web-like portion joining said inner end to said outer end permitting axial and canting motion of said outer end,
(f) means on said outer end adjacent said reinforcing member forming a spring retaining seat,
(g) an external flange formed on the inner end of said sleeve, and
(h) a spiral compression spring mounted by and retained between said spring retaining seat and said flange,
(i) said passage in said flange-like head being relatively large as compared with both the opening in said sleeve and the radially inner extent of said second sealing surface so that said passage will overlie the opening in said sleeve in various lateral positions of said conduits relative to each other, and
(j) the radially outer extent of said second sealing surface being relatively large as compared with said passage in said flange-like head to insure a fluid-tight seal in various lateral positions of said conduits relative to each other,
(k) whereby a contact only, fully sealed fluid flow connection is formed between said conduits.

References Cited in the file of this patent

UNITED STATES PATENTS

| | | |
|---|---|---|
| 1,433,663 | Small | Oct. 31, 1922 |
| 2,558,620 | Lisota | June 26, 1951 |
| 2,654,386 | Wotring | Oct. 6, 1953 |
| 2,704,675 | Henderson | Mar. 22, 1955 |
| 2,733,831 | Nehls | Feb. 7, 1956 |
| 2,796,192 | Nehls | June 18, 1957 |
| 2,835,269 | Seymour | May 20, 1958 |

FOREIGN PATENTS

| | | |
|---|---|---|
| 1,120,776 | France | July 12, 1956 |
| 825,025 | Germany | Dec. 17, 1951 |